US010417110B2

(12) United States Patent
Morin et al.

(10) Patent No.: US 10,417,110 B2
(45) Date of Patent: Sep. 17, 2019

(54) METHOD FOR VERIFYING TRACEABILITY OF FIRST INSTRUCTIONS IN A PROCEDURAL PROGRAMMING LANGUAGE GENERATED FROM SECOND INSTRUCTIONS IN A MODELLING LANGUAGE

(71) Applicant: Safran Electronics & Defense, Boulogne-Billancourt (FR)

(72) Inventors: Severine Morin, Boulogne-Billancourt (FR); Bertrand Corruble, Boulogne-Billancourt (FR); Bertrand Tavernier, Boulogne-Billancourt (FR); Frederic Titeux, Boulogne-Billancourt (FR); Guy Renault, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/500,908

(22) PCT Filed: Aug. 3, 2015

(86) PCT No.: PCT/EP2015/067858
§ 371 (c)(1),
(2) Date: Jan. 31, 2017

(87) PCT Pub. No.: WO2016/016473
PCT Pub. Date: Feb. 4, 2016

(65) Prior Publication Data
US 2017/0242775 A1    Aug. 24, 2017

(30) Foreign Application Priority Data

Aug. 1, 2014  (FR) ...................................... 14 57513
Jul. 31, 2015  (FR) ...................................... 15 57401

(51) Int. Cl.
G06F 8/41    (2018.01)
G06F 11/36   (2006.01)
(Continued)

(52) U.S. Cl.
CPC .......... G06F 11/3604 (2013.01); G06F 8/311 (2013.01); G06F 8/35 (2013.01);
(Continued)

(58) Field of Classification Search
None
See application file for complete search history.

(56) References Cited

U.S. PATENT DOCUMENTS 8,464,204 B1 * 6/2013 Thornton ............ G06F 11/3608
717/100
8,522,196 B1   8/2013 Kim et al.
(Continued)

OTHER PUBLICATIONS

O'Halloran, C., et al., "Verification of picture generated code", Automated Software Engineering, 14th IEEE International Conference, Cocoa Beach, Florida, Oct. 12-15, 1999, 127-136.
(Continued)

*Primary Examiner* — Lewis A Bullock, Jr.
*Assistant Examiner* — Mark A Gooray
(74) *Attorney, Agent, or Firm* — Womble Bond Dickinson (US) LLP

(57) ABSTRACT

The present invention concerns a method for verifying traceability of first code instructions in a procedural programming language generated from second code instructions in a modelling language, characterized in that it comprises the implementation, by a piece of equipment (1), of steps of: (a) Syntactic analysis: o of the first instructions so as to generate an AST, and o of the second instructions so as to generate an MDT; (b) Semantic analysis: o Of the AST so as to identify patterns representative of basic functional
(Continued)

blocks of the first instructions; o Of the MDT so as to identify characteristic properties of basic functional blocks of the second instructions; (c) Matching, pairwise, the identified basic functional blocks, and confirming the traceability of first code instructions only if: o for each block of the first instructions, there is a functionally equivalent block in the second instructions, and o for each block of the second instructions, there is a functionally equivalent block in the first instructions.

9 Claims, 3 Drawing Sheets

(51) Int. Cl.
G06F 8/35 (2018.01)
G06F 8/30 (2018.01)

(52) U.S. Cl.
CPC ........... *G06F 8/42* (2013.01); *G06F 8/427* (2013.01); *G06F 8/433* (2013.01); *G06F 8/436* (2013.01); *G06F 11/3608* (2013.01)

(56) References Cited

U.S. PATENT DOCUMENTS

| | | |
|---|---|---|
| 8,583,414 B1 | 11/2013 | Aldrich et al. |
| 8,627,276 B2 | 1/2014 | Lin et al. |
| 2005/0114841 A1 | 5/2005 | Moskowitz et al. |
| 2005/0224841 A1 | 10/2005 | Nakamura et al. |
| 2009/0089741 A1* | 4/2009 | Bornhoevd ............ G06F 8/34 717/106 |
| 2012/0060142 A1* | 3/2012 | Fliess .................. G06F 8/70 717/102 |
| 2012/0254827 A1 | 10/2012 | Conrad et al. |

OTHER PUBLICATIONS

Safran Electronics & Defense, "French preliminary search report", FR Application No. 1457513, dated Apr. 24, 2015 (with English translation cover sheet).

Safran Electronics & Defense, "French preliminary search report", FR Application No. 1557401, dated Apr. 29, 2016 (with English translation cover sheet).

Safran Electronics & Defense, "International Search Report", PCT Application No. PCT/EP2015/067858, dated Oct. 27, 2015 (with English translation cover sheet).

* cited by examiner

METHOD FOR VERIFYING TRACEABILITY OF FIRST INSTRUCTIONS IN A PROCEDURAL PROGRAMMING LANGUAGE GENERATED FROM SECOND INSTRUCTIONS IN A MODELLING LANGUAGE

GENERAL TECHNICAL FIELD

The present invention relates to automated generation of code from models, and in particular a method for verifying traceability of first code instructions in a procedural programming language produced from second code instructions in a modelling language.

STATE OF THE ART

Aircraft of the last generation massively resort to computer science and use for this embedded software.

Modelling and generation environments allow users to automatically produce source code from models.

However, today it is not possible to guarantee to these users that the generated source code is actually entirely traceable towards these models, i.e. there may exist sequences of code instructions (i.e. fragments) which do not have a direct relationship with the upstream models and which may trigger undesirable functional behaviours.

The source code generated from the models is not actually "by design" traceable towards the models. However, flawless reliability is required considering the disastrous consequences which may have a computer processing error during the flight of an aircraft, and the presence of non-traceable instructions is not acceptable.

The present state of the art either consists of manually verifying the absence of non-traceable source code instructions towards the models, and in the case of presence of such instructions, of manually justifying that they cannot introduced any unexpected functional behaviour, or of producing campaigns of low level tests on the executable object code in order to ensure that any structure of the code has actually been exerted by the tests, and there therefore exist no (or more) instructions which cannot be attainable (which would reveal the presence of non-traceable code instructions towards the models).

Automatic verification techniques have been proposed for example in documents U.S. Pat. Nos. 8,627,276 and 8,583,414. The idea is to use test data of an object code generated as elements for analyzing and controlling the model traceability towards the generated code. These methods provide satisfaction, but do not always give the possibility of 100% guaranteeing that the traceable code is transitive towards the models, and thus do not give the possibility of doing without a structural coverage step to be carried out manually at the code.

Thus it would be desirable to have a reliable and reproducible method giving the possibility of producing entirely traceable source code to the models, of confirming that the produced source code is actually entirely traceable to the models, and to demonstrate in a reliable and systematic way that the structural coverage step obtained at the models may be extrapolated at the automatically generated source code.

Further, it would be desirable that this method be eligible to certification.

PRESENTATION OF THE INVENTION

According to a first aspect, the present invention therefore relates to a method for verifying traceability of first code instructions in a procedural programming language generated from second code instructions in a modelling language, characterized in that it comprises the application by data processing means of a piece of equipment of steps for:
(a) Syntax analysis:
  of the first code instructions according to a library of said procedural programming language so as to generate an abstract syntax tree (AST) of the first instructions, and
  second code instructions according to a library of said modelling language so as to generate a modelling tree (MDT) of the second instructions
(b) Semantic analysis:
  Of the abstract syntax tree (AST) of the first instructions so as to identify patterns representative of elementary functional blocks of the first instructions;
  Of the modelling tree (MDT) of the second instructions so as to identify properties characteristic of elementary functional blocks of the second instructions;
(c) Pairwise matching the identified elementary functional blocks, and confirming traceability of the first code instructions only if:
  for each block of the first instructions, there exists a functionally equivalent block of the second instructions, and
  for each block of the second instructions, there exists a functionally equivalent block of the first instructions.

According to other advantageous and non-limiting features:
  said modelling language is a graphic programming language;
  said graphic programming language is Simulink® or Scilab;
  the procedural programming language is a language based on C;
  each identified block comprises an interaction with at least one other block, the step (c) comprising the pairwise matching of said interactions, and the confirmation of traceability of the first code instructions only if:
    for each interaction between two blocks of the first instructions, there exist the same interaction between the two corresponding blocks of the second instructions, and
    for each interaction between two blocks of the second instructions, there exist the same interaction between the two corresponding blocks of the first instructions.
  the step (b) also comprises the semantic analysis of the abstract syntax tree (AST) of the first instructions so as to identify the variables of the first instructions, and the semantic analysis of the modelling tree (MDT) of the second instructions so as to identify the signals and the constants of the second instructions;
  the method comprises a step (d) for matching the variables identified with the identified signals and constants, identified depending on generation rules of said procedural programming language from the modelling language, and confirmation of traceability of first code instructions only if for each identified variable, there exists identified corresponding signal and/or constant;
  the method comprises a subsequent step (e) for instanciation of the first code instructions in a system if their traceability is confirmed;
  the method comprises a preliminary step (a0) for generating the second code instructions from the second code instructions by the data processing means.

According to a second aspect, the invention relates to a piece of equipment for verifying traceability of first code instructions in a procedural programming language produced from second code instructions in a modelling language, characterized in that it comprises data processing means configured for applying:

A syntax analysis module:
of the first code instructions according to a library of said procedural programming language so as to generate an abstract syntax tree (AST) of the first instructions, and
of the second code instructions according to a library of said modelling language so as to generate a modelling tree (MDT) of the second instructions.

a semantic analysis module:
of the abstract syntax tree (AST) of the first instructions so as to identify patterns representative of elementary functional blocks of the first instructions;
of the modelling tree (MDT) of the second instructions so as to identify properties characteristic of elementary functional blocks of the second instructions;

A module for pairwise matching of the identified elementary functional blocks, and for confirming traceability of first code instructions only if:
for each block of the first instructions, there exists a functionally equivalent block of the second instructions, and
for each block of the second instructions, there exists a functionally equivalent block of the first instructions.

According to a fifth and sixth aspect, the invention relates to a computer program product comprising code instructions for executing a method according to the first aspect of the invention for verifying traceability of first code instructions in a procedural programming language generated from second code instructions in a modelling language; and storage means legible by a piece of computer equipment on which a computer program product comprises code instructions for executing a method of the first aspect of the invention for verifying traceability of first code instructions in a procedural programming language generated from second code instructions in a modelling language.

PRESENTATION OF THE FIGURES

Other features and advantages of the present invention will become apparent upon reading the description which follows of a preferential embodiment. This description will be given with reference to the appended drawings wherein.

DETAILED DESCRIPTION

Architecture

Figure 1:
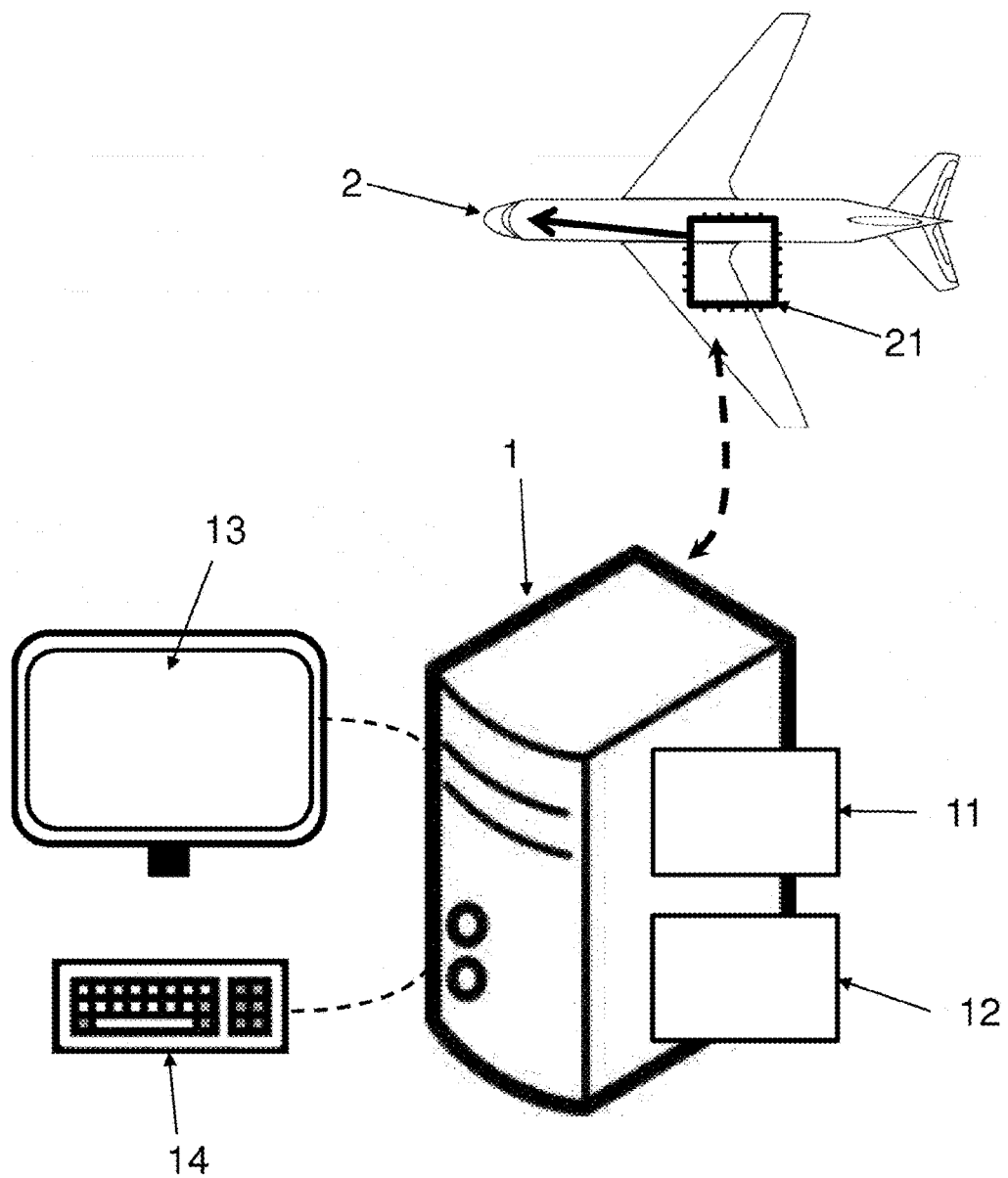
FIG. 1 represents a system for applying the method according to the invention.

With reference to FIG. 1, the present method is a method for verifying traceability of first code instructions in a procedural programming language produced from second code instructions in a modelling language.

The method is applied via a piece of equipment 1 which may be any computer station comprising data processing means 11 (for example a processor), data storage means 12 (for example a hard disk) and means for displaying a graphic interface 13 (for example a screen).

Input means 14 (such as a keyboard and a mouse) give the possibility to a user who wishes to use the method (and/or graphically program) for interacting with the graphic interface 13. It should be noted that the present method is not limited to the use of a workstation, and that other types of pieces of equipment such as a server may be used altogether.

By procedural (or algorithmic) programming is meant a programming paradigm in which a "procedure" simply contains a series of steps to be carried out, to each of which other procedures may be called, see the actual procedure (recursivity). The first code instructions form a source code, in a procedural language typically of the C type (or for example an object oriented language of the Java type), intended to be compiled into an executable code and then to be loaded on a system 2, for example a piece of computer equipment 21 of an aircraft. The first instructions are for example a C source file (.c) accompanied with a header file (.h).

The modelling language (that of the second instructions), or MDL ("Model Description Language"), is as for it typically a graphic programming language, in particular Simulink®, Scilab, or any other equivalent. Conventionally, graphic programming (which may be produced via the piece of equipment 1 or another similar piece of equipment, the example will be taken here where it is the first piece of equipment but one skilled in the art will be able to transpose this) comprises the selection and then the arrangement via the graphic interface 13 of a plurality of graphic elements each representative of a computer functional object (typically called blocks), and then their wiring through connections, which form the second code instructions. The second instructions are for example an .mdl file accompanied with an initialization file (.m).

A functional block may be defined as an elementary mathematical function of the form $\{y_0; y_1; \ldots y_n\} = f(u_0; u_1; \ldots u_m; x(t))$, in other words, a logical unit determining one or several output parameters from one or several input parameters and from a possible internal state $x(t)$. This definition is compliant with Model-Based Design (MBD). In the second instructions, a functional block is typically a graphic block (a "box" with its inputs and outputs to be wired). In the first instructions, a functional block is typically illustrated by one or several lines of codes. It will be noted that a functional block of first instructions may consist of non-contiguous code fragments.

From the second instructions, a module (applied by the data processing means) generates and stores on the data storage means 12 the first code instructions by using a library of rules for generating said procedural programming language from the modelling language. In the example of Simulink, the generation module is for example an RTW (Real-Time Workshop). This generation module has to interpret the model according to its inputs for generating a code adapted to the inputs and optionally optimizing this code. If required this is a preliminary step (a0) of the method.

Method

The present method aims at guaranteeing that the generated code (the first instructions) actually corresponds to the original models (the second instructions). The code should be traceable and transitive, i.e. each functional block of the first instructions should be able to be related on a one-to-one basis to the functional blocks of the second instructions: there should be "all the required code, but nothing else than the required code". In other words, there should not be any false/missing code or "unexpected" code which may perturb the application of the expected functions.

Figure 2:
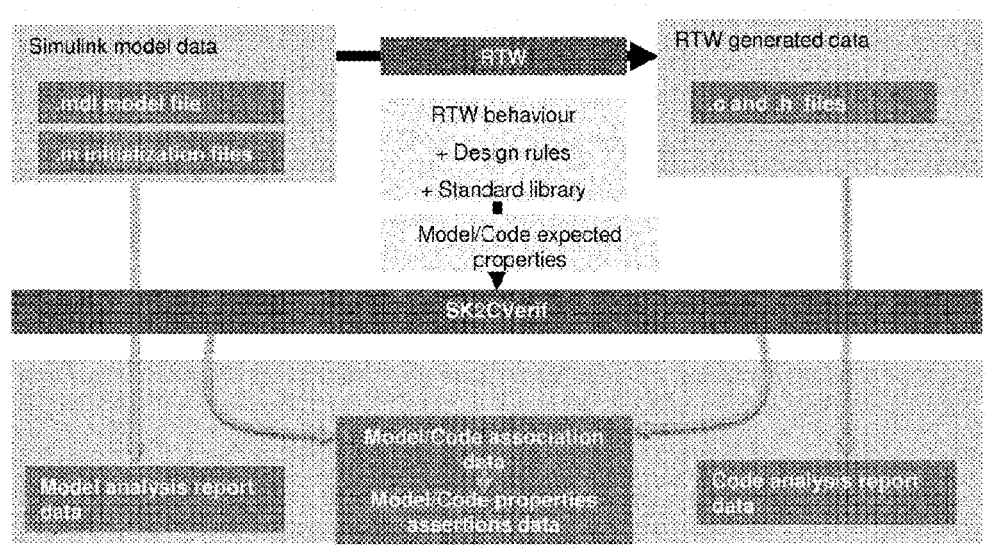
FIG. 2 is a general illustration of the architecture of an embodiment of the method according to the invention.

With reference to FIG. 2, which illustrates an example in the case when C is generated from Simulink via RTW, the present method (applied via a program called SK2CVerif) for this begins by applying with the data processing means 11 of the piece of equipment 1 of a step (a) of syntax analysis of each of the first and second instructions. Suitable tools ("parsers") are known, often stemming from compilation techniques, for example Lex-Yacc (Lex is a lexical analyzer, used in combination with Yacc which is a syntax analyzer).

By syntax analysis, is meant showing the structure, in the grammatical sense, of the instructions.

Syntax analysis of the first code instructions is carried out according to a library of said procedural programming language, so as to produce what is called an abstract syntax tree (AST, "Abstract Syntax Tree") of the first instructions.

This is a tree, the internal nodes of which are marked with operators and for which the leaves (or external nodes) represent the operands of these operators. In other words, a leaf is generally a variable or a constant. This is an intermediate representation of the first code instructions.

The syntax analysis of the second code instructions as for it is applied according to a library of said modelling language, and gives the possibility of generating a modelling tree (MDT, "Modelling Tree") of the second instructions. By modelling tree, is meant a tree representing the architecture of the blocks (nesting structure and functional links) of the model formed with the second instructions.

In a second part (b), a semantic analysis follows the syntax analysis. There where the syntax analysis exclusively studies the structure of the text, the semantic analysis studies the sense of the text. Semantic analysis requires an interpretation of the model according to the inputs in the same way as the generation module as well as an identification of the possible optimizations of the first instructions.

The idea is to identify by means of the trees of the properties in the first and second instructions. More specifically, semantic analysis of the abstract syntax tree (AST) of the first instructions gives the possibility of identifying patterns representative of elementary functional blocks of the first instructions, and the analysis of the modelling tree (MDT) of the second instructions gives the possibility of identifying properties specific and characteristic of elementary functional blocks of the second instructions.

By "pattern", is meant a typical arrangement within the structure of the AST, i.e. an arrangement compatible with a given backbone, which reveals the presence of a functional block within the first instructions. Indeed, as an AST is a tree-like illustration of the first instructions, any functional block validly coded will correspond to a sub-tree of the AST from a "root" node. In other words, the step (b) typically consists of covering the AST by searching for sub-trees compatible with predetermined backbones.

As regards MDT, the cutting up into blocks is by definition obvious since each functional block corresponds to a graphic block, and it is sufficient to identify the "properties" of each block for characterizing them. For example the number of inputs/outputs, the type of processing carried out, etc.

In both cases, the goal is to list and characterize the different blocks in each of the first and second instructions so as to be able to contrast them.

Advantageously, the semantic analysis further allows determination of the "dictionaries" of the first and second instructions for which the blocks are one of the elements. More specifically the variables of the first instructions and the signals and constants of the second instructions may be identified.

At this stage, the functional blocks identified for each of the first and second instructions are matched pairwise. Indeed, if the code is traceable then each block of the first instructions corresponds to an equivalent block of the second instructions and vice-versa. The matching has to be on a one-to-one basis so that traceability is guaranteed.

If one block of the first instructions does not have any equivalent in the second instructions, it is that this block corresponds to excess code which should be suppressed from the first instructions.

If one block of the second instructions does not have any equivalent in the first instructions, it is that the associated function is missing in the generated code and that the latter is probably faulty.

If several blocks of the first instructions correspond to a single block of the second instructions, it is that a portion of the first instructions is unnecessarily redundant and should be suppressed.

In other words, traceability of the first code instructions is only confirmed if:
 for each block of the first instructions, there exists a functionally equivalent block of the second instructions, and
 for each block of the second instructions, there exists a functionally equivalent block of the first instructions.

By functionally equivalent, is meant that the properties of one block of the second instructions coincide with the functionalities of a second block of the first instructions. In other words, traceability of the first code instructions is not confirmed if it is impossible to produce matching of the blocks, for example if there exists one block of the second instructions having identified properties which do not correspond to any of the blocks of the first instructions, or if there exists a block of the first instructions, which does not have the identified properties of any of the seconds blocks.

Detection of the Interaction Problems

Further, the time arrangements of the blocks should correspond (such a function should follow such a function, etc.). More specifically, each identified block comprises an interaction with at least one other block, the step (c) comprising the pairwise matching of said interactions, and the confirmation of traceability of first code instructions only if:
 optionally, for each interaction between two blocks of the first instructions, there exist the same interaction between the two corresponding blocks of the second instructions, and
 for each interaction between two blocks of the second instructions, there exist the same interaction between the two corresponding blocks of the first instructions.

A particular interaction case is time dependency, i.e. the fact that a block is applied before or after another, as this will be explained further on. More specifically, each interaction is in this embodiment a partial order relation.

This gives the possibility of avoiding inversions of patterns and poor links even when all these functions will be resumed.

More specifically, it should be noted that there is no uniqueness of the representation of second instructions with the first instructions. Indeed n blocks have n! implementation orders, but a large number of them prove to be acceptable. This is due to the fact that the order is partial and not total, which means that certain blocks are independent and may be applied relatively to each other in one order like in the other.

The verification of these partial order relations and not the verification of a particular complete ordering as this may be found in the prior art, proves to be evidence of independence between the verification method and the method for generating the first instructions.

This matching of the interactions of the relative blocks to the sequences may be accomplished in two sub-steps:

the blocks of the second instructions are analyzed in order to determine the interactions between the blocks of the second instructions in the form of a set of conditions required and sufficient (in the sense of the model semantics of the second instructions), each is a partial order relation of the Bi<Bj type expressing the anteriority of Bi with respect to Bj (in other words, there exists a condition Bi<Bj, i.e. the application of Bj requires the preliminary application of Bi). These conditions are advantageously inferred from the MDT used as a graph.

The order of implantation of the corresponding blocks of the first instructions is analyzed so as to verify that each of these conditions (i.e. each partial order relation) is verified in the first instructions. This notably comprises the test of each condition. The idea is that a condition Bi<Bj is verified if the first instructions are such that the lines coding for Bi are executed before the lines coding for Bj in the first instructions, this is what is called the implementation order (which does not necessarily correspond to the order of the code lines). If this is not the case, a so called <<freshness>> error is detected. If this is the case, it is sure that the implementation of the first instructions is one of the acceptable solutions as to the partial order defined in the second instructions As a summary, the verification that for each interaction between two blocks of the second instructions, there exist the same interaction between the two corresponding blocks of the first instructions, consists in the verification that each of said partial order relations determined between blocks of the second instructions is observed by the implementation order in the first instructions of the corresponding blocks of the first instructions.

For example, if the second instructions code for five blocks A, B, C, D, E such that:

C uses as an input the outputs of B and D;
B uses as an input the outputs of A;
E uses as an input the outputs of C.

Then the determined interactions are A<B<C<E (in fact these are three transitive binary conditions) and D<C.

A-B-D-C-E is a first acceptable solution of the first instructions, D-A-B-C-E is a second acceptable solution of the first instructions, but A-B-C-D-E is not one of them.

In the case when variables, signals and constants have been identified, the method may comprise a step (d) for matching the identified variables with the identified signals and constants according to the rules for generating said procedural programming language from the modelling language.

Traceability of the first code instructions is then only confirmed if for each identified variable, there exists identified corresponding signal and/or constant.

If each of these tests is conclusive, it is possible to be sure that the generated code is entirely traceable and transitive to the original models, since each functional unit and each variable is verified.

If its traceability is confirmed, the first code instructions (or a compiled version) are instanciated in a system 2 such as an aircraft.

Results

Figure 3:
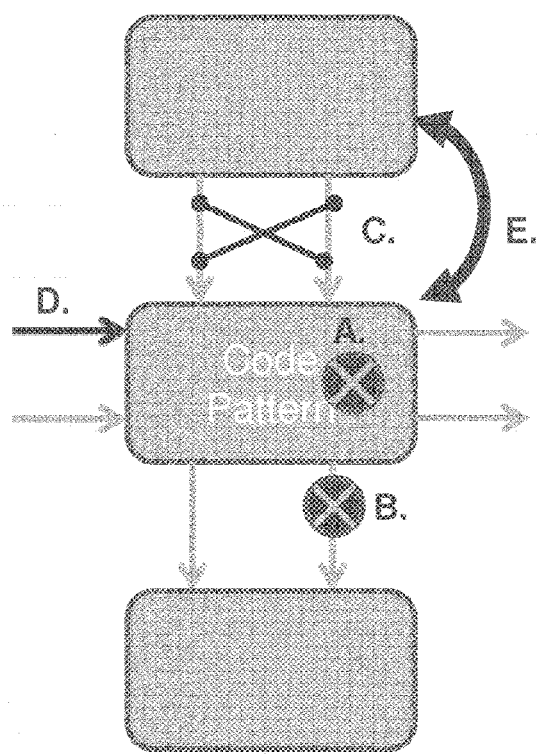
FIG. 3 is a diagram illustrating the capabilities of verifying the method according to the invention.

With reference to FIG. 3 (which functionally illustrates three patterns of the code in interaction), the previous method is capable of detecting the following errors:

A: "Code pattern corruption", i.e. an error inside the pattern (the block does not have the function which it should have, and no equivalent is found);

B: "Output variable computation", the output result of the block is false (and the latter does not always fulfill its function);

C: "Incorrect input variable connection", subsequent to a wiring error, the block receives swapped variables (poor interaction between blocks).

D: "Type issue", an input variable does not have the right type (poor interaction between blocks);

E: "Freshness issue". Two blocks (each of them valid) were swapped (again poor interactions between blocks).

System

According to a second aspect, the invention relates to a piece of equipment 1 for applying the previous method. The piece of equipment 1 is in particular a station for generating a computer code.

This piece of equipment comprises data processing means (for example a processor) configured for applying:

(a) A syntax analysis module:
  of the first code instructions according to a library of said procedural programming language so as to generate an abstract syntax tree (AST) of the first instructions, and
  of the second code instructions according to a library of said modelling language so as to generate a modelling tree (MDT) of the second instructions.

(b) A semantic analysis module:
  Of the abstract syntax tree (AST) of the first instructions so as to identify patterns representative of elementary functional blocks of the first instructions;
  Of the modelling tree (MDT) of the second instructions so as to identify properties characteristic of elementary functional blocks of the second instructions;

(c) A module for pairwise matching of the identified elementary functional blocks, and for confirming traceability of first code instructions only if:
  for each block of the first instructions, there exists a functionally equivalent block of the second instructions, and
  for each block of the second instructions, there exists a functionally equivalent block of the first instructions.

Computer Program Product

According to third and fourth aspects, the invention relates to a computer program product comprising code instructions for executing (in particular on the processing means 11 of the piece of equipment 1) verifying traceability of the first code instructions in a procedural programming language generated from second code instructions in a modelling language, as well as storage means legible by a piece of computer equipment (notably a memory 12 of the piece of equipment 1) on which is found this computer program product.

The invention claimed is:

1. A method for verifying traceability of first code instructions in a procedural programming language generated from second code instructions in a modelling language, characterized in that it comprises the application by data processing means of a piece of equipment of steps for:

(a) Syntax analysis:
of the first code instructions according to a library of said procedural programming language so as to generate an abstract syntax tree of the first code instructions, and
of the second code instructions according to a library of said modelling language so as to generate a modelling tree of the second code instructions;
(b) A semantic analysis:
Of the abstract syntax tree of the first code instructions so as to identify patterns representative of elementary functional blocks of the first instructions so as to identify said functional blocks in the code first instructions; and
Of the modelling tree of the second code instructions so as to identify properties characteristic of elementary functional blocks of the second code instructions so as to identify said functional blocks in the second code instructions;
(c) Pairwise matching of the identified elementary functional blocks and of interactions between said blocks, and confirming traceability of the first code instructions only if:
for each block of the first code instructions, there exists a functionally equivalent block of the second code instructions;
for each block of the second code instructions, there exists a functionally equivalent block of the first code instructions; and
for each interaction between two blocks of the second code instructions, there exist the same interaction between the two corresponding blocks of the first code instructions;
wherein said interactions between blocks correspond to partial order relations representing the time dependency of two blocks, and
wherein step (c) comprises the preliminary determination of a plurality of partial order relations between blocks of the second instructions, the verification that for each interaction between two blocks of the second instructions, there exist the same interaction between the two corresponding blocks of the first instructions, consisting in the verification that each of said partial order relations determined between blocks of the second instructions is observed by the implementation order in the first instructions of the corresponding blocks of the first instructions; and
(d) Instantiation of the first code instructions in a system if their traceability is confirmed.

2. The method according to claim 1, wherein said modelling language is a graphic programming language.

3. The method according to claim 2, wherein said graphic programming language is Simulink® or Scilab.

4. The method according to claim 1, wherein the procedural programming language is a language based on C.

5. The method according to claim 1, wherein the step (b) also comprises the semantic analysis of the abstract syntax tree of the first code instructions so as to identify the variables of the first code instructions, and the semantic analysis of the modelling tree of the second code instructions so as to identify the signals and the constants of the second code instructions.

6. The method according to claim 5, comprising a step (d) for matching the identified variables with the identified signals and constants, identified depending on generation rules of said procedural programming language from the modelling language, and confirmation of traceability of first code instructions only if for each identified variable, there exists identified corresponding signal and/or constant.

7. The method according to claim 1, comprising a preliminary step (a0) for generating the first code instructions from the second code instructions by the data processing means.

8. A non-transitory storage legible by a piece of computer equipment on which a computer program product is stored comprising code instructions for executing a method according to claim 1 for verifying traceability of the first code instructions in a procedural programming language generated from second code instructions in a modelling language.

9. A piece of equipment for verifying traceability of first code instructions in a procedural programming language produced from second code instructions in a modelling language, characterized in that it comprises data processing means configured for applying:
A syntax analysis module:
of the first code instructions according to a library of said procedural programming language so as to generate an abstract syntax tree of the first code instructions, and
of the second code instructions according to a library of said modelling language so as to generate a modelling tree of the second code instructions;
A semantic analysis module:
Of the abstract syntax tree of the first code instructions so as to identify patterns representative of elementary functional blocks of the first code instructions so as to identify said functional blocks in the first code instructions; and
Of the modelling tree of the second code instructions so as to identify properties characteristic of elementary functional blocks of the second code instructions so as to identify said functional blocks in the second code instructions;
A module for pairwise matching of the identified elementary functional blocks and of interactions between said blocks, and for confirming traceability of the first code instructions only if:
for each block of the first code instructions, there exists a functionally equivalent block of the second code instructions;
for each block of the second code instructions, there exists a functionally equivalent block of the first code instructions; and
for each interaction between two blocks of the second code instructions, there exist the same interaction between the two corresponding blocks of the first code instructions,
wherein said interactions between blocks correspond to partial order relations representing the time dependency of two blocks, and
wherein pairwise matching of interactions between said blocks comprises the preliminary determination of a plurality of partial order relations between blocks of the second instructions, the verification that for each interaction between two blocks of the second instructions, there exist the same interaction between the two corresponding blocks of the first instructions, consisting in the verification that each of said partial order relations determined between blocks of the second instructions is observed by the implementation order in the first instructions of the corresponding blocks of the first instructions; and A module for instantiation of the first code instructions in a system if their traceability is confirmed by said confirming traceability.

\* \* \* \* \*